(12) United States Patent
Hauvespre et al.

(10) Patent No.: US 11,585,373 B2
(45) Date of Patent: Feb. 21, 2023

(54) PULLEY DEVICE, IN PARTICULAR FOR TENSIONING IDLER OR RUNNER ROLLER

(71) Applicant: Aktiebolaget SKF, Gothenburg (SE)

(72) Inventors: Benoît Hauvespre, Saint Etienne de Chigny (FR); Gwenael Hingouet, Saint-Cyr-sur-Loire (FR); Kévin Lefort, Donges (FR); Thomas Perrotin, Saint Roch (FR)

(73) Assignee: Aktiebolaget SKF, Gothenburg (SE)

( * ) Notice: Subject to any disclaimer, the term of this patent is extended or adjusted under 35 U.S.C. 154(b) by 396 days.

(21) Appl. No.: 16/747,035

(22) Filed: Jan. 20, 2020

(65) Prior Publication Data
US 2020/0256378 A1 Aug. 13, 2020

(30) Foreign Application Priority Data

Feb. 11, 2019 (DE) .......................... 102019201751.7

(51) Int. Cl.
*F16H 7/20* (2006.01)
*F16C 13/00* (2006.01)
*F16H 7/08* (2006.01)

(52) U.S. Cl.
CPC .......... *F16C 13/006* (2013.01); *F16H 7/20* (2013.01); *F16C 2361/63* (2013.01); *F16H 2007/0865* (2013.01)

(58) Field of Classification Search
CPC ...... F16C 13/006; F16C 2361/63; F16H 7/20; F16H 2007/0865
USPC .................................................. 474/199, 166
See application file for complete search history.

(56) References Cited

U.S. PATENT DOCUMENTS

| 4,893,946 | A | * | 1/1990 | Tesh | F16C 13/006 |
|---|---|---|---|---|---|
| | | | | | 384/549 |
| 2014/0155210 | A1 | * | 6/2014 | Ichikawa | F16C 35/067 |
| | | | | | 474/174 |
| 2014/0254970 | A1 | * | 9/2014 | Guilford | F16C 43/065 |
| | | | | | 29/898.064 |
| 2018/0223982 | A1 | * | 8/2018 | Nakao | F16C 33/586 |

FOREIGN PATENT DOCUMENTS

| DE | 202005011230 U1 | 9/2005 | |
|---|---|---|---|
| GB | 190509598 A | 5/1906 | |
| GB | 141829 A | 4/1920 | |
| WO | WO-2006092187 A1 * | 9/2006 | ............ F16C 13/006 |

* cited by examiner

*Primary Examiner* — Gene O Crawford
*Assistant Examiner* — Emily R Kincaid
(74) *Attorney, Agent, or Firm* — Garcia-Zamor Intellectual Property Law; Ruy Garcia-Zamor; Bryan Peckjian

(57) ABSTRACT

A pulley device provides a pulley, and a bearing. The pulley has at least one C-shaped pulley part having an inner portion mounted on the bearing, an outer portion having an outer cylindrical surface dedicated to interact with a belt or a chain, and an intermediate portion extending substantially radially between axial ends of inner and outer portions on one axial side of pulley device. A grip surface portion is provided to one surface among the outer cylindrical surface of the outer ring and the inner cylindrical surface of the inner cylindrical portion of the pulley part, the grip surface portion including a plurality of indentations and recesses.

20 Claims, 6 Drawing Sheets

PULLEY DEVICE, IN PARTICULAR FOR TENSIONING IDLER OR RUNNER ROLLER

CROSS-REFERENCE TO RELATED APPLICATIONS

This application claims priority to German Patent Application no. 102019201751.7, filed Feb. 11, 2019, the contents of which are fully incorporated herein by reference.

TECHNICAL FIELD OF THE INVENTION

The present invention relates to the field of pulley devices for tensioning idlers or runner rollers designed to interact with a chain or a belt, for example a distribution belt of an internal combustion engine of a vehicle.

BACKGROUND OF THE INVENTION

Such rollers are usually used to keep a constant tension on the belt or chain in a determined range or to locally modify the path taken by the chain or belt. These are called respectively tensioning idlers or runner rollers. In runner rollers, the pulley is mounted so as to rotate on a screw or a spindle by means of a rolling bearing, the roller then being attached directly or indirectly to the engine block or to an element of a tensioning idler device, for example an articulated arm or an eccentric.

Document GB 190509598 discloses a pulley comprising male and female overlapping parts which are interlocking relation and form a cylindrical outer portion intended to be in contact with a belt.

A major disadvantage of this pulley is that an annular recess is formed on the outer portion adapted to support the belt when the male and female parts are fastened together. There is therefore a risk of an early wear of the belt.

It is also known by document GB 141 829 a pulley comprising a peripheral part intended to be in contact with a belt, an inner part and a intermediate part between the inner and outer parts. The pulley is tightened to the outer ring of bearing, but the pulley can slightly axially move during the service use of pulley device. Moreover, with a pulley such as disclosed, the outer part may be deformed radially inwards by bending under the action of the belt.

It has been proposed in document DE 202005011230 U1 to house a damping ring within a C-shaped pulley, the damping element being dedicated to damp vibrations from the belt and being suitable to limit radial inward deformation of outer portion of the pulley. However, the pulley can still be deformed under heavy loads.

SUMMARY OF THE INVENTION

The aim of the invention is to overcome these drawbacks by proposing a pulley which is easy to install onto a bearing, of good rigidity, adapted to avoid an early wear of the belt, and permitting an efficient support of the belt.

To this end, the invention relates to a pulley device suitable for a belt of chain tensioning idler or runner roller, comprising a bearing and a pulley.

The bearing comprises a rotatable outer ring and a fixed inner ring, the rings being coaxial.

The pulley comprises at least one pulley part having in cross section an overall shape of a C, and having an inner portion with an inner surface mounted on an outer cylindrical surface of outer ring of bearing, an outer cylindrical portion having an outer cylindrical surface intended to be in contact with the belt or the chain, and a radial intermediate portion extending substantially radially between axial ends of inner and outer cylindrical portions on one axial side of pulley device, the pulley part being formed integral and defining an open end on one axial side opposite to the intermediate portion.

According to the invention, a grip surface portion is provided to one surface among the outer cylindrical surface of outer ring and inner cylindrical surface of inner cylindrical portion of pulley part. The grip surface portion comprises a plurality of indentations and recesses.

According to further aspects of the invention which are advantageous but not compulsory, such a pulley device may incorporate one or several of the following features:

The bearing is a rolling bearing, at least one row of rolling elements being radially interposed between the inner ring and the outer ring.

The rolling elements are balls.

The rolling elements are equally circumferentially spaced and maintained by an annular cage.

The pulley is formed by only one pulley part.

The pulley comprises two C-shaped pulley parts mounted onto the outer cylindrical surface of outer ring of bearing.

Open ends of the two pulley parts axially face each other, free ends of outer portions of pulley parts being in axial abutment.

The two pulley parts are symmetrical with respect to a transverse radial plane passing through the centre of the bearing.

The total length of the inner portions of the two C-shaped pulleys mounted onto the outer ring is at least equal to 90% of the axial length of the outer cylindrical surface of the outer ring.

The outer portion of pulley part is of greater axial length than that of the inner portion, the outer portion protruding axially on at least one axial side of the inner portion.

The inner portion of pulley part is cylindrical, with an inner cylindrical portion.

The pulley part is made from a stamped metal sheet or blank.

The inner cylindrical portion of pulley part is force fitted onto the outer cylindrical surface of outer ring.

The grip surface portion is provided to the outer cylindrical surface of outer ring.

The grip surface portion is provided to the inner cylindrical surface of inner cylindrical portion of pulley part.

The grip surface portion is manufactured by a knurling process.

The pitch of indentations and recesses is comprised between 0.1 and 1 mm.

The indentations and recesses of grip surface portion have a criss-cross pattern, a straight-line pattern, or any other suitable shape.

The grip surface portion is annular.

BRIEF DESCRIPTION OF THE DRAWINGS

The invention will now be explained in correspondence with the annexed figures, as illustrative examples, without restricting the object of the invention. In the annexed figures.

DETAILED DESCRIPTION OF SOME EMBODIMENTS

Figure 1:
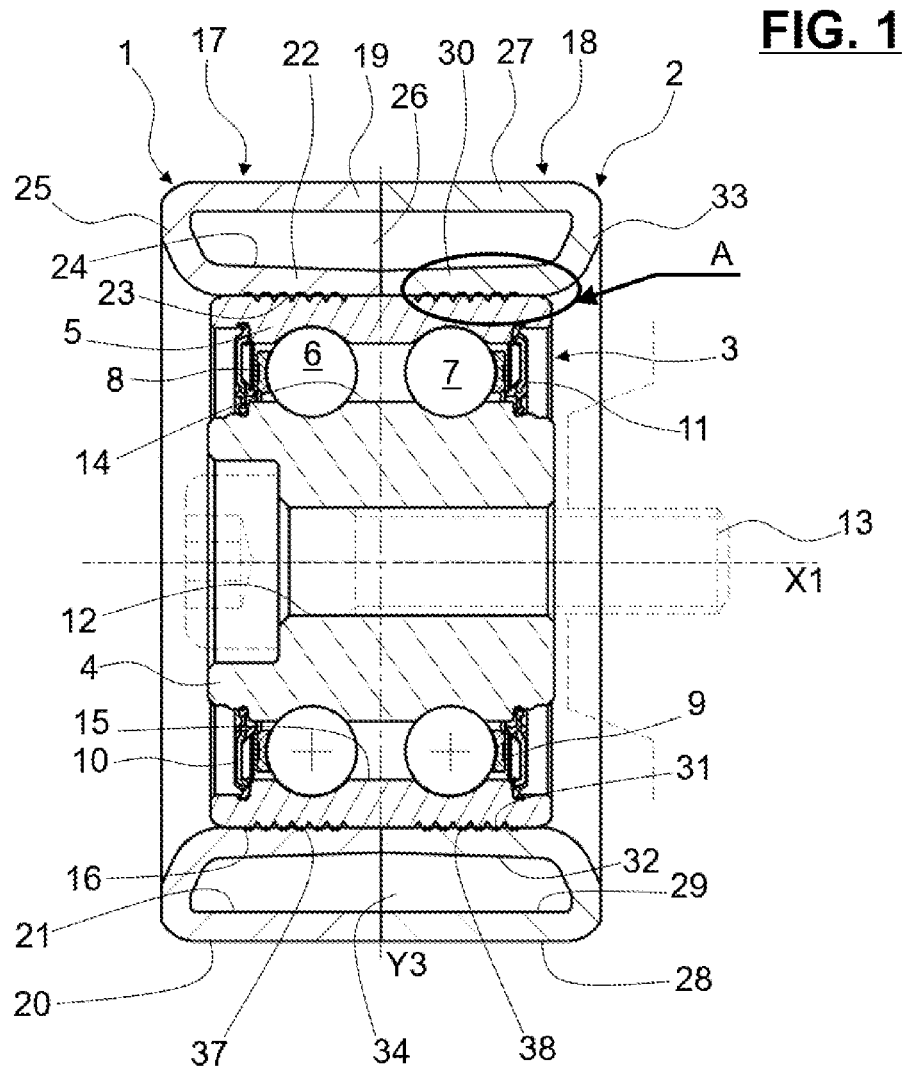
FIG. 1 is an axial section of a pulley device according to a first embodiment of the invention.
Figure 2:
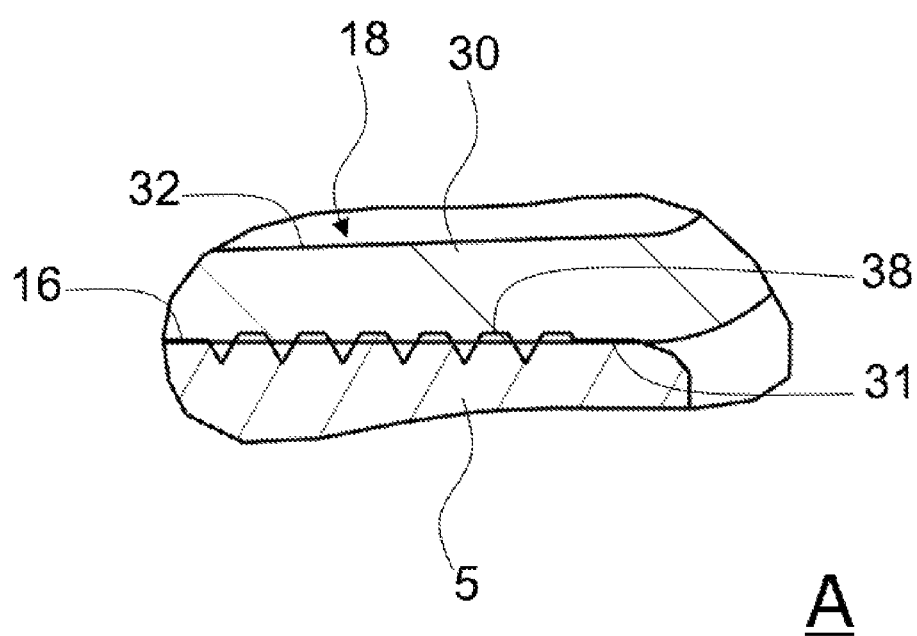
FIG. 2 is a detailed view A of the pulley device of FIG. 1.
Figure 3:
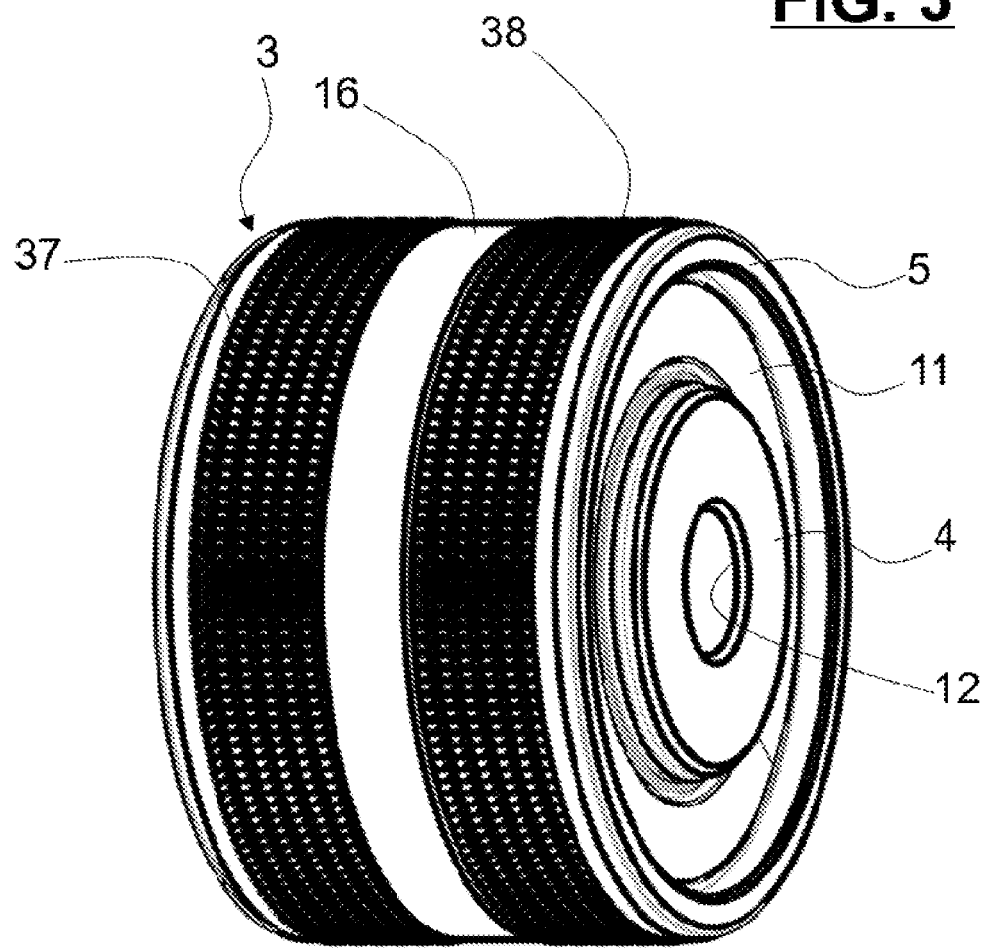
FIG. 3 is a perspective view of a bearing provided to the pulley device of FIG. 1.

The pulley device 1 as illustrated in FIGS. 1 to 3 is suitable for a belt or chain tensioning idler or runner roller, and comprises a pulley 2 adapted to interact with a belt or chain (not shown) and a rolling bearing 3 with a geometric axis X1.

The rolling bearing comprises a fixed inner ring 4 and a rotatable outer ring 5 between which are housed two rows of rolling elements 6 and 7, which in this case are balls, two annular cages 8, 9 respectively maintaining the circumferential spacing of the rolling elements 6, 7, and two annular seals 10, 11.

The inner ring 4 and the outer ring 5 are concentric and symmetric with respect to a transverse radial plane Y3 passing through the centre of the rolling bearing 3. The rings 4, 5 are advantageously of solid type. A solid type is to be understood as a ring obtained by machining with removal of material, by machining, grinding, from a metal tube stock, bar stock, rough forgings and/or rolled blanks.

The inner ring 4 comprises a bore 12 dedicated to receive a fastening screw 13 (in dotted line) to fasten the device 1 on an external support. The inner ring further comprises an outer cylindrical surface 14 onto which toroidal circular raceways are formed, the raceways having in cross section a concave internal profile adapted to the rolling elements 6, 7.

The outer ring 5 comprises a cylindrical bore 15 onto which toroidal circular raceways are formed, the raceways having in cross section a concave internal profile adapted to receive the rolling elements 6, 7. The outer ring 5 further comprises an outer cylindrical surface 16.

The pulley 2 has two pulley parts 17, 18, both having in cross section an overall shape of a C.

The first pulley part 17 comprises an axial annular outer portion 19 providing a cylindrical outer surface 20 designed to interact with a portion of the belt of the chain, and a cylindrical inner surface or bore 21.

The first pulley part 17 also comprises an axial annular inner portion 22 providing a cylindrical inner surface or bore 23 into which the outer cylindrical surface 16 of outer ring 5 of bearing 3 is mounted, and a cylindrical outer surface 24.

The outer portion 19 is of larger diameter than that of the inner portion 22, the outer portion 19 radially surrounding the inner portion 22. Advantageously, the outer portion 19 is of greater axial length than that of the inner portion 22, the outer portion 19 protruding axially on at least one axial side of the inner portion 22.

The first pulley part 17 further comprises an annular radial intermediate portion 25 extending substantially radially between axial ends of inner and outer cylindrical portions 22, 19 on a first axial side of pulley device 1.

The first pulley part 17 then has in cross section an overall shape of a C, defining an open end 26 on one axial side of the pulley device 1. The first pulley part 17 is formed integral.

The second pulley part 18 comprises an axial annular outer portion 27 providing a cylindrical outer surface 28 designed to interact with a portion the belt of the chain, and a cylindrical inner surface or bore 29.

The second pulley part 18 also comprises an axial annular inner portion 30 providing a cylindrical inner surface or bore 31 into which the outer cylindrical surface 16 of outer ring 5 of bearing 3 is mounted, and a cylindrical outer surface 32.

The outer portion 27 is of larger diameter than that of the inner portion 30, the outer portion 27 radially surrounding the inner portion 30. Advantageously, the outer portion 27 is of greater axial length than that of the inner portion 30, the outer portion 27 protruding axially on at least one axial side of the inner portion 30.

The second pulley part 18 further comprises an annular radial intermediate portion 33 extending substantially radially between axial ends of inner and outer cylindrical portions 30, 27 on a second axial side of pulley device 1, the second axial side being axially opposite to the first axial side.

The second pulley part 18 then has in cross section an overall shape of a C, defining an open end 34 on one axial side of the pulley device 1. The second pulley part 18 is formed integral.

Advantageously, the pulley parts 17, 18 are both made of thin metal sheet or blank by folding, cutting and stamping.

Advantageously, the inner cylindrical portions 22, 30 of first and second pulley parts 17, 18 are force fitted onto the outer cylindrical surface 16 of outer ring 5.

Advantageously, the two C-shaped pulley parts 17, 18 are symmetrical with each other with respect to the radial plane Y3. The free ends of outer portions 19, 27 of first and second pulley parts 17, 18 respectively come into contact in an axial direction, the open ends 26, 34 respectively being axially open to each other. The two outer cylindrical surfaces 20, 28 form a surface dedicated to interact with the belt or the chain. The pulley 2 formed by the two pulley parts 17, 18 arranged in axial contact with each other is suitable for guiding, supporting the belt of the chain with an efficient manner.

According a first embodiment of the invention, the outer cylindrical surface 16 of outer ring 5 is provided with two annular grip surface portions 37, 38.

As illustrated in FIGS. 2 and 3, grip surface portions 37, 38 comprise each a plurality of indentations and recesses. Advantageously, the pitch of indentations and recesses is comprised between 0.1 and 1 mm. Advantageously, the indentations and recesses of grip surface portions 37, 38 have a criss-cross pattern, a straight-line pattern, or any other suitable shape.

The grip surface portions 37, 38 are advantageously manufactured by a knurling process, with a knurling tool.

The outer cylindrical surface 16 comprises a first grip surface portion 37 on a first axial side, and a second grip surface portion 38 on a second axial side.

The first grip surface portion 37 extends axially on 70% of the axial length of inner cylindrical surface 23 of inner cylindrical portion 22 of first pulley part 17. Inner cylindrical surface 23 and outer cylindrical surface 16, and more particularly grip surface portion 37, are in interference fit. Grip surface portion 37 increases the surface roughness of outer cylindrical surface 16 and permits to limit any relative axial displacement between first pulley part 17 and outer ring 5.

Similarly and symmetrically with respect to the radial plane Y3, the second grip surface portion 38 extends axially on 70% of the axial length of inner cylindrical surface 31 of inner cylindrical portion 30 of second pulley part 18. Inner cylindrical surface 31 and outer cylindrical surface 16, and more particularly grip surface portion 38, are in interference fit. Grip surface portion 38 increases the surface roughness of outer cylindrical surface 16 and permits to limit any relative axial displacement between second pulley part 18 and outer ring 5.

The pulley 2 comprising the two pulley parts 17, 18 is then axially retained in both axial directions with respect to the outer ring 5 of bearing 3. Even in case of heavy vibrations or shocks, the pulley 2 is prevented for axial movement and is suitable to efficiently support the belt of the chain for an increased and efficient service life.

As an alternate not shown, grip surface portions 37, 38 are connected each other to form one unique grip surface portion on outer cylindrical surface 16 of outer ring 5.

Figure 4:
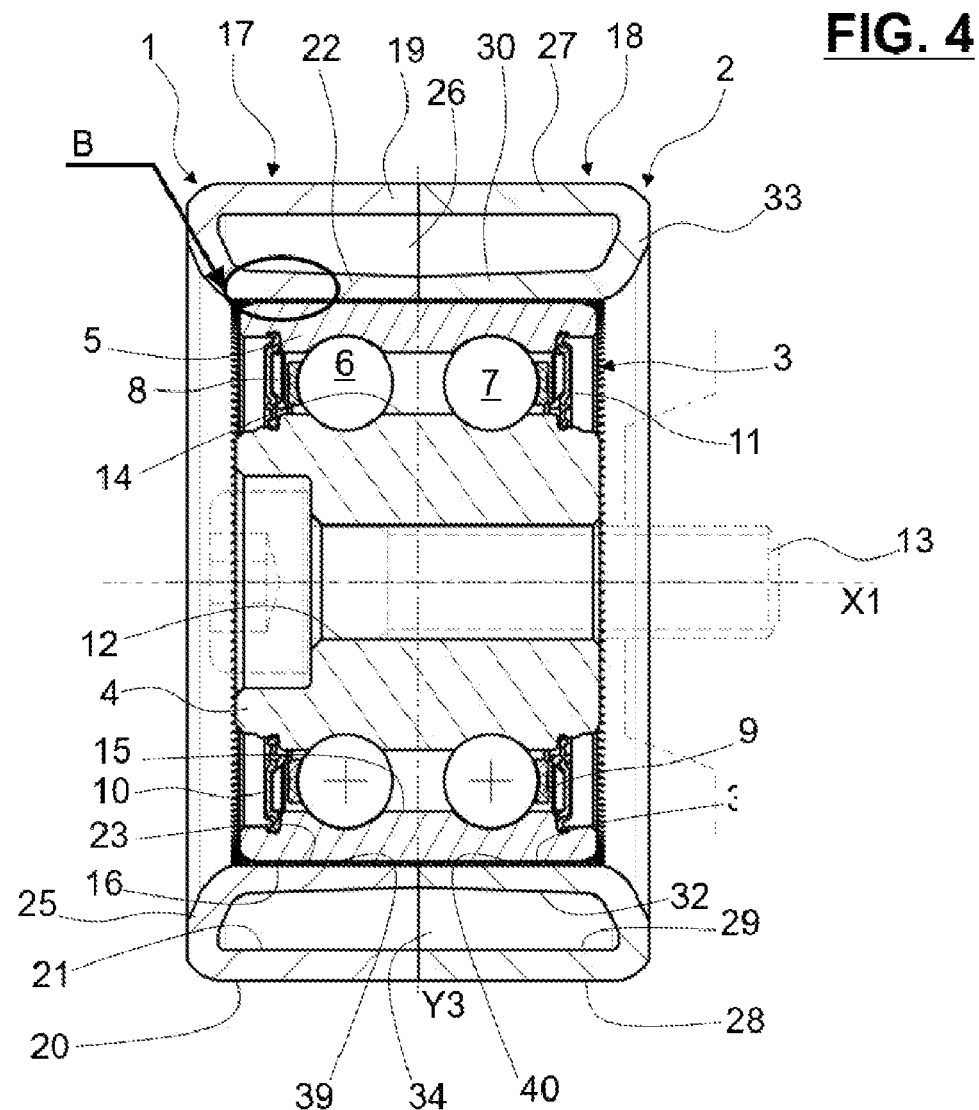
FIG. 4 is an axial section of a pulley device according to a second embodiment of the invention.
Figure 5:
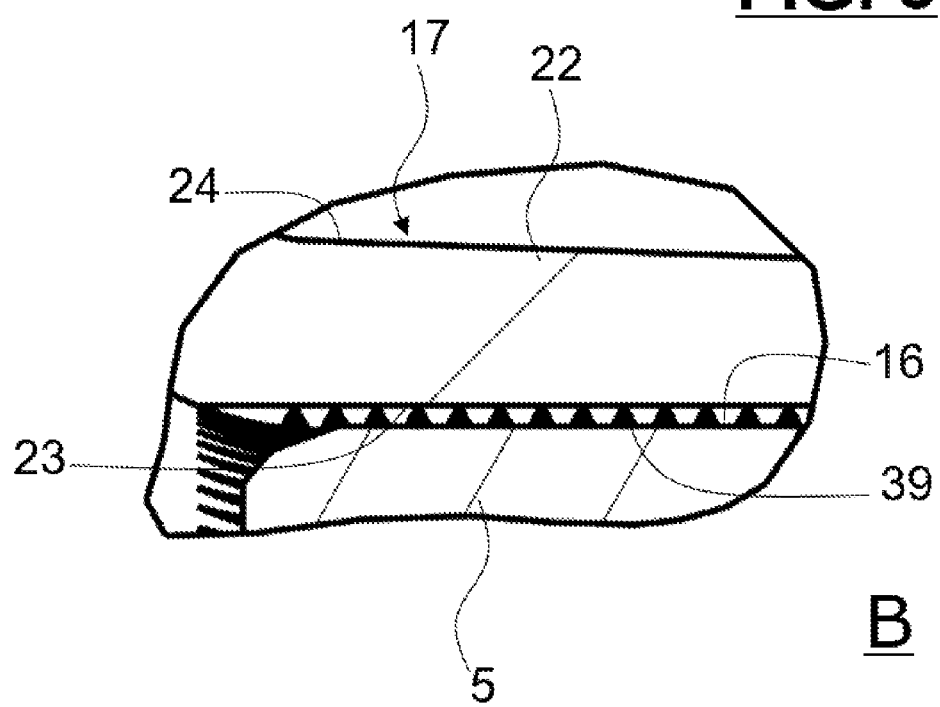
FIG. 5 is a detailed view B of the pulley device of FIG. 4.
Figure 6:
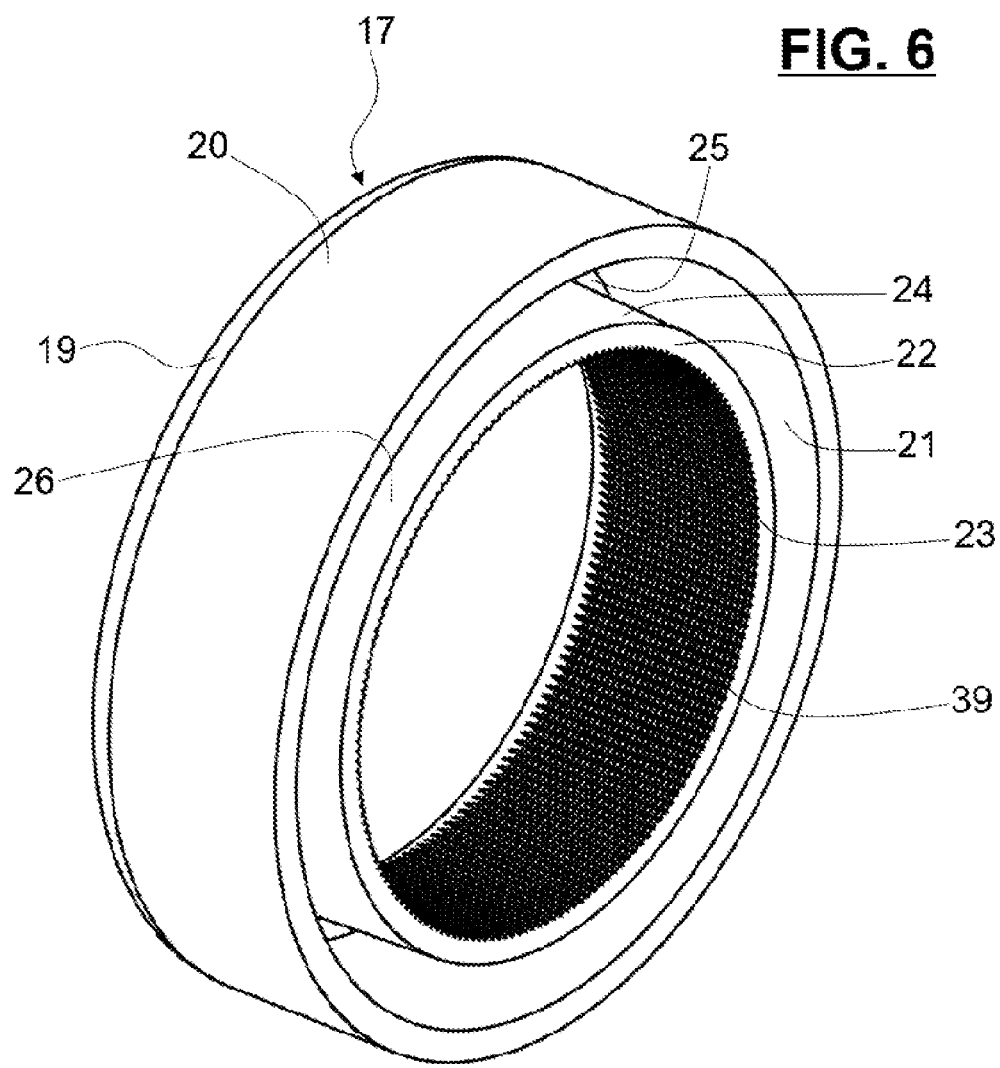
FIG. 6 is a perspective view of a bearing provided to the pulley device of FIG. 4.

A second embodiment of the invention is illustrated in FIGS. 4 to 6.

The inner cylindrical surfaces 23, 31 of inner cylindrical portions 22, 30 of pulley parts 17, 18 are each provided with annular grip surface portions 39, 40.

As illustrated in FIGS. 5 and 6, grip surface portion 39 of first pulley part 17 comprises a plurality of indentations and recesses. Similarly, grip surface portion 40 of second pulley part 18 also comprises a plurality of indentations and recesses.

The grip surface portions 39, 40 are advantageously manufactured by a knurling process, with a knurling tool.

Inner cylindrical surface 23 of first pulley part 17, and more particularly the grip surface portion 39, and outer cylindrical surface 16 are in interference fit. Grip surface portion 39 increases the surface roughness of inner cylindrical surface 23 and permits to limit any relative axial displacement between first pulley part 17 and outer ring 5. Similarly, inner cylindrical surface 31 of second pulley part 18, and more particularly the grip surface portion 40, and outer cylindrical surface 16 are in interference fit. Grip surface portion 40 increases the surface roughness of inner cylindrical surface 31 and permits to limit any relative axial displacement between second pulley part 18 and outer ring 5.

As an alternate not illustrated, the pulley device 1 may comprise only one pulley part 17 or 18. According to another alternate embodiment not illustrated, the pulley device comprises a pulley 2 with two C-shaped pulley parts 17, 18 but mounted on the outer cylindrical surface 16 of outer ring 5 with both intermediate portions 25, 33 in axial abutment against each other, the open ends 26, 34 of the pulley parts 17, 18 being open on opposite axial sides of pulley device 1.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved pulley device.

Moreover, various features of the above-described representative examples, as well as the various independent and dependant claims below, may be combined in ways that are not specifically and explicitly enumerated in order to provide additional useful embodiments of the present teachings.

The invention claimed is:

1. A pulley device suitable for a belt chain tensioning idler or a runner roller, comprising:
   a bearing having a rotatable outer ring and a fixed inner ring, the rotatable outer ring and the fixed inner ring being coaxial; and
   a pulley provided with at least one pulley part having in cross section an overall shape of a C and having a radially innermost cylindrical portion with a radially innermost cylindrical surface mounted on an outer cylindrical surface of the rotatable outer ring of the bearing, the at least one pulley part further having an outer cylindrical portion having an outer cylindrical surface configured to contact with the belt or the chain tensioning idler, the outer cylindrical surface being of greater axial length than the radially innermost cylindrical surface such that the outer cylindrical portion protrudes axially on at least one axial side of the radially innermost cylindrical portion, and a radial intermediate portion extending substantially radially between axial ends of the radially innermost cylindrical portion and the outer cylindrical portion on the at least one axial side of the pulley device, the at least one pulley part being formed integral and defining an open end on the at least one axial side opposite to the intermediate portion, the at least one pulley part further comprising a grip surface portion provided to one surface among the outer cylindrical surface of the rotatable outer ring and the radially innermost cylindrical surface of the radially innermost cylindrical portion of the at least one pulley part, the grip surface portion comprising a plurality of indentations and recesses.

2. The pulley device according to claim 1, wherein the pulley is formed by only one pulley part.

3. The pulley device according to claim 1, wherein the pulley comprises two pulley parts, which have C-shaped cross sections, mounted onto the outer cylindrical surface of the rotatable outer ring of the bearing.

4. The pulley device according to claim 3, wherein the open ends of the two pulley parts axially face each other, the free ends of the outer portions of the pulley parts being in axial abutment.

5. The pulley device according to claim 3, wherein the two pulley parts are symmetrical with respect to a transverse radial plane passing through the centre of the bearing.

6. The pulley device according to claim 1, wherein the radially innermost cylindrical portion of the at least one pulley part is press fit onto the outer cylindrical surface of the rotatable outer ring.

7. The pulley device according to claim 1, wherein the grip surface portion is manufactured by a knurling process.

8. The pulley device according to claim 1, wherein the pitch of the plurality of indentations and recesses is comprised between a range of 0.1 mm and 1 mm.

9. The pulley device according to claim 1, wherein the plurality of indentations and recesses of the grip surface portion have a criss-cross pattern or a straight-line pattern.

10. The pulley device according to claim 1, wherein the grip surface portion is annular.

11. A pulley device suitable for a belt configured for use with at least one of a tensioning idler and a runner roller, the pulley device comprising:
    a bearing having an outer ring and an inner ring, the outer ring and the inner ring being coaxial; and
    a pulley provided with a pulley part generally having a C-shaped cross section and having a radially innermost cylindrical pulley portion with a radially innermost cylindrical pulley surface mounted on an outer cylindrical outer ring surface of the bearing, the pulley part further having an outer cylindrical pulley portion having an outer cylindrical pulley surface configured to contact with the belt, the outer cylindrical surface being of greater axial length than the radially innermost cylindrical pulley surface such that the outer cylindrical pulley portion protrudes axially on at least one axial side of the radially innermost cylindrical pulley portion, and a radial intermediate pulley portion extending substantially radially between axial ends of the radially innermost cylindrical pulley portion and the outer cylindrical pulley portion on one axial side of the pulley device, the pulley part being formed integral with and defining an open end on one axial side opposite to the radial intermediate pulley portion; the pulley part further comprising a first grip surface and a second grip surface disposed on the outer ring and configured to contact the belt, the first grip surface and the second grip surface each comprising a plurality of indentations and recesses, the outer cylindrical outer ring surface having a portion without the grip surface which is located between the first grip surface and the second grip surface.

12. A combination pulley device and belt, the combination comprising:
   a belt;
   a pulley device, comprising:
   a bearing having an outer ring and an inner ring, the outer ring and the inner ring being coaxial; and
   a pulley provided with a pulley part generally having a C-shaped cross section and having a radially innermost cylindrical pulley portion with a radially innermost cylindrical pulley surface mounted on an outer cylindrical outer ring surface of the bearing, the pulley part further having an outer cylindrical pulley portion having an outer cylindrical pulley surface in contact with the belt, the outer cylindrical surface being of greater axial length than the radially innermost cylindrical pulley surface such that the outer cylindrical pulley portion protrudes axially on at least one axial side of the radially innermost cylindrical pulley portion, and a radial intermediate pulley portion extending substantially radially between axial ends of the radially innermost cylindrical pulley portion and the outer cylindrical pulley portion on one axial side of the pulley device, the pulley part being formed integral with and defining an open end on one axial side opposite to the radial intermediate pulley portion; the pulley part further comprising a first grip surface and a second grip surface disposed on the outer ring and configured to contact the belt, the first grip surface and the second grip surface each comprising a plurality of indentations and recesses, the outer cylindrical outer ring surface having a portion without the grip surface which is located between the first grip surface and the second grip surface.

13. The pulley device according to claim 11, wherein the pulley comprises two pulley parts, which have C-shaped cross sections, mounted onto the outer cylindrical surface of the outer ring of the bearing.

14. The pulley device according to claim 13, wherein the open ends of the two pulley parts axially face each other, the free ends of the outer portions of the pulley parts being in axial abutment.

15. The pulley device according to claim 13, wherein the two pulley parts are symmetrical with respect to a transverse radial plane passing through the centre of the bearing.

16. The pulley device according to claim 11, wherein the radially innermost cylindrical portion of the pulley part is press fit onto the outer cylindrical surface of the outer ring.

17. The pulley device according to claim 11, wherein the grip surface portion is manufactured by a knurling process.

18. The pulley device according to claim 11, wherein the pitch of the plurality of indentations and recesses is comprised between a range of 0.1 mm and 1 mm.

19. The pulley device according to claim 11, wherein the plurality of indentations and recesses of the grip surface portion have a criss-cross pattern or a straight-line pattern.

20. The pulley device according to claim 11, wherein the grip surface portion is annular.

* * * * *